(12) United States Patent
Dengler

(10) Patent No.: US 9,574,665 B2
(45) Date of Patent: Feb. 21, 2017

(54) SLIDE RING SEAL

(75) Inventor: Andreas Dengler, Friedberg (DE)

(73) Assignee: FEDERAL-MOGUL BURSCHEID GMBH, Burscheid (DE)

( * ) Notice: Subject to any disclaimer, the term of this patent is extended or adjusted under 35 U.S.C. 154(b) by 68 days.

(21) Appl. No.: 13/984,989

(22) PCT Filed: Jan. 20, 2012

(86) PCT No.: PCT/DE2012/000050
§ 371 (c)(1),
(2), (4) Date: Aug. 12, 2013

(87) PCT Pub. No.: WO2012/110016
PCT Pub. Date: Aug. 23, 2012

(65) Prior Publication Data
US 2013/0320628 A1    Dec. 5, 2013

(30) Foreign Application Priority Data
Feb. 17, 2011    (DE) .................. 10 2011 011 475

(51) Int. Cl.
*F16J 15/34*    (2006.01)

(52) U.S. Cl.
CPC .............. *F16J 15/34* (2013.01); *F16J 15/344* (2013.01)

(58) Field of Classification Search
CPC .................................. F16J 15/34; F16J 15/344
USPC .................. 277/370, 390, 380–385
See application file for complete search history.

(56) References Cited

U.S. PATENT DOCUMENTS

| 4,166,627 | A | | 9/1979 | Bainard et al. |
| 4,256,315 | A | * | 3/1981 | Larson et al. ................. 277/381 |
| 4,558,872 | A | | 12/1985 | Vossieck et al. |
| 5,199,719 | A | * | 4/1993 | Heinrich et al. ............... 277/374 |
| 5,558,343 | A | * | 9/1996 | Aparicio, Jr. .................. 277/393 |
| 6,494,459 | B1 | | 12/2002 | Zutz |
| 2002/0105147 | A1 | * | 8/2002 | Zutz .............................. 277/380 |
| 2005/0110219 | A1 | * | 5/2005 | Tsuboi et al. ................. 277/358 |
| 2011/0204574 | A1 | | 8/2011 | Gruenaug |

FOREIGN PATENT DOCUMENTS

| CN | 1619195 | 5/2005 |
| CN | 102119291 | 7/2011 |
| DE | 27 46 594 | 4/1978 |
| DE | 197 53 918 | 7/1999 |

(Continued)

*Primary Examiner* — Vishal Patel
(74) *Attorney, Agent, or Firm* — Norris McLaughlin & Marcus, P.A.

(57) ABSTRACT

The invention relates to a slide ring seal, and in particular a running gear seal, at least comprising an angled slide ring and/or counter ring, the radial leg of which forms a sliding region, and the axial leg of which forms a seating for a sealing element, which radially outside of the sliding region, is provided with a projection that at least partially overlaps the radial leg, forming a secondary seal, wherein at least in the region of the radial leg, the projection is provided with a profile, which is supported on the outer circumferential surface of the radial leg, forming anti-contamination lips in the installed state of the slide ring seal, and in particular running gear seal, that profile being supported on the outer circumferential surface of the radial leg when viewed in the axial direction.

5 Claims, 2 Drawing Sheets

(56) References Cited

FOREIGN PATENT DOCUMENTS

| | | |
|---|---|---|
| DE | 199 55 860 | 6/2001 |
| EP | 0 157 097 | 10/1985 |
| EP | 1 353 099 | 10/2003 |
| EP | 1 533 550 | 5/2005 |
| JP | 2005-155663 | 6/2005 |
| WO | WO 2008049529 A1 * | 5/2008 |

* cited by examiner

SLIDE RING SEAL

BACKGROUND OF THE INVENTION

The invention relates to a slide ring seal, and in particular a running gear seal accordance with the category-defining part of the first patent claim.

In the case of running gear seals with rubber rings, penetrating contamination under high pressure (for example a turning maneuver on a bulldozer) exerts an axially acting force on the rubber rings. A force that opposes the requisite closing force can not only reduce the axial force creating the closing force, but even cancel it completely, so that contamination is able to penetrate through the sealing gap of the slide ring seal, for example into a downstream transmission. With increased friction, increased force can result in overheating and, consequently, in damage to the seal.

This problem has long been known, and transmission wear-out and transmission failures as a result of seal failure are unacceptable.

A first attempt at a solution is described in DE 199 55 860 A1. The slide ring seal disclosed here, which in particular is a running gear seal, comprises an angular slide ring and/or counter ring with a specific circumferential surface for receiving an annular sealing element with an approximately plate-shaped cross section, the sealing element containing a secondary seal in the region of the sealing shank. In this attempt at a solution, it has been shown that if contamination penetrates from outside, the secondary sealing lip will fold in, and thus the problem is the same as described above.

U.S. Pat. No. 4,256,315 relates to a slide ring seal, and in particular a running gear seal which, analogously to DE 199 55 860 A1, is likewise provided with a secondary seal. That seal is either located, in parts, on the outer circumferential surface of the glide ring or the counter ring respectively, or on the full surface thereof. Here again it is inevitable that the axial forces created as a result of the penetration of dirt cause the slide ring seal to open, entailing disadvantageous penetration by dirt.

SUMMARY OF THE INVENTION

The primary object of the present invention is to further develop a slide ring seal, and in particular a running gear seal, to the extent that, regardless of any penetrating dirt, there is no reduction in the requisite closing force of the seal, whereby the service lives of both the seal and of the downstream components such as transmission components are increased.

This object is achieved in that, when viewed in an axial direction, a projection is provided with a profile, at least in the region of the radial leg, wherein that profile is supported on the outer circumferential surface of the radial leg, forming an anti-contamination lip when the slide ring seal, and in particular a running gear seal, is in the installed state.

As the projection also forms a secondary seal in a manner analogous to U.S. Pat. No. 4,256,315, which has a profile that forms multiple anti-contamination lips, the projection will not be displaced by penetrating contamination to such an extent that the closing force necessary to close the seal is reduced.

The chambered profiling can be formed in the manner of a labyrinth, so that even contamination that penetrates the labyrinth tends to solidify so that it cannot be transported further in the direction of downstream components, such as transmission components.

According to another aspect of the invention, the profile, which forms the anti-contamination lips, can be formed as a corrugated profile.

The anti-contamination lips are advantageously formed so as to have a triangular or quadrangular cross section.

In many cases, slide rings and counter rings of a slide ring seal, in particular a running gear seal, are integrated into a housing element. In order to be able to achieve a good static seal against the receiving housing part here as well, it is also proposed that a contour be provided that approximately corresponds to the profile on the side of the projection that is radially opposite from the profile, the contour being in operative connection with the mating surface of the receiving housing part.

As a result of the proposed geometry of the secondary seal, folding or deformation of the secondary seal as a result of the force of contamination being applied is reliably prevented. The proposed geometry directs the force of infiltrating contamination directly into the respective housing element so that there can be no impact on the seal itself. As a result of the strong radial distortion of the secondary seal, the centering of the slide rings is also improved and the holding torque between the slide ring and/or counter ring and the respective housing part and elastomer is increased.

With the embodiment according to the invention, not only can the service life of the seal be substantially increased, but for example the service lives of downstream components such as transmission components can also be improved.

The subject matter of the application is depicted in the drawings based on an embodiment, and is described as follows. Therein:

DETAILED DESCRIPTION OF THE INVENTION

Figure 1:
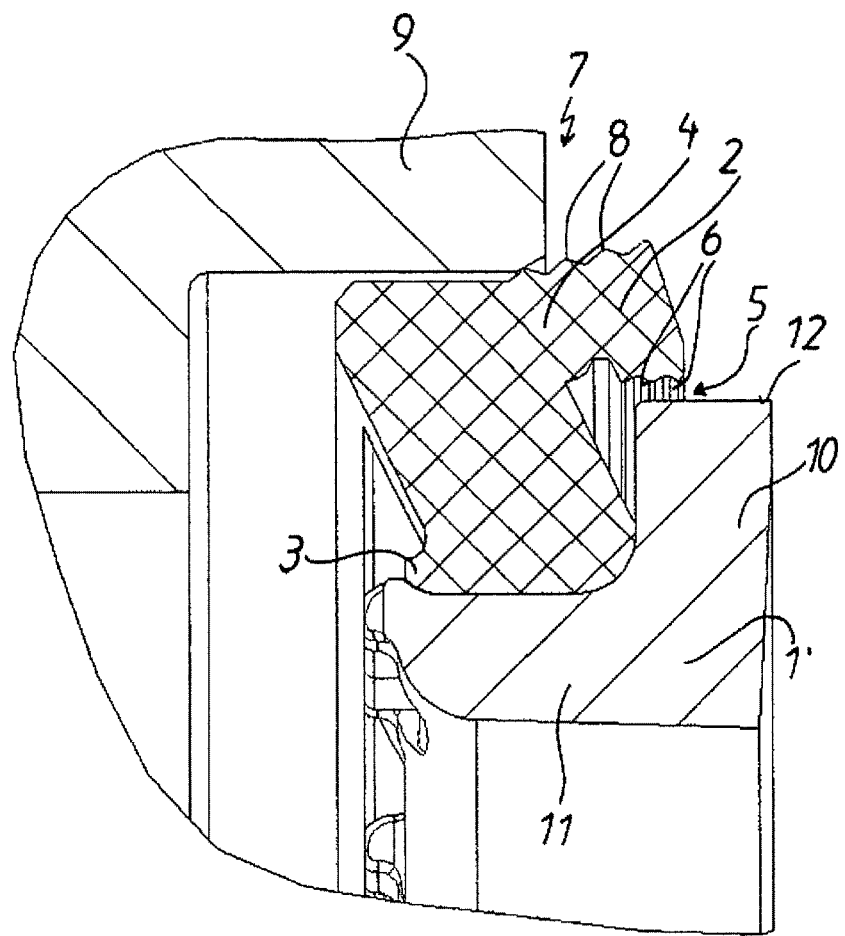
FIG. 1 shows a cutaway view of the running gear seal in position prior to assembly.

FIG. 1 shows a cross section through a slide ring seal 1 formed as a running gear seal in position prior to assembly, including a sealing element 2 made of an elastomer material. The sealing element 2 has a base body on which, when viewed in a circumferential direction, projections 3 that extend in a radial and axial direction are integrally formed. These projections 3 form a later anti-rotation lock for the slide ring seal 1. Likewise integrally formed from the sealing element 2 is an axial leg 4 formed as a projection extending in an axial direction. The projection 4 has profiles 6 introduced on the inner circumferential surface 5 thereof, forming anti-contamination lips, the projection being supported on a slide ring 1' via these profiles. The profile 6 can be formed as a labyrinth or as a corrugated profile with different geometric contours, as required. The axial leg 4 thereby forms a secondary seal. On the outer circumferential surface 7 of the projection 4 located radially opposite from the profile 6, additional profiles 8 have been introduced in the form of protrusions, which are in operative connection with a housing element 9 that receives the slide ring 1', forming a static seal. The slide ring 1' has a radial leg 10 and an axial leg 11. In the installed state, the projection 4 rests on the radial outer circumferential surface 12 of the slide ring with the profile 6 thereof forming anti-contamination lips.

Depicted is the state in which the slide ring 1', together with the sealing element 6, is to be pressed into the housing element 9.

Figure 2:
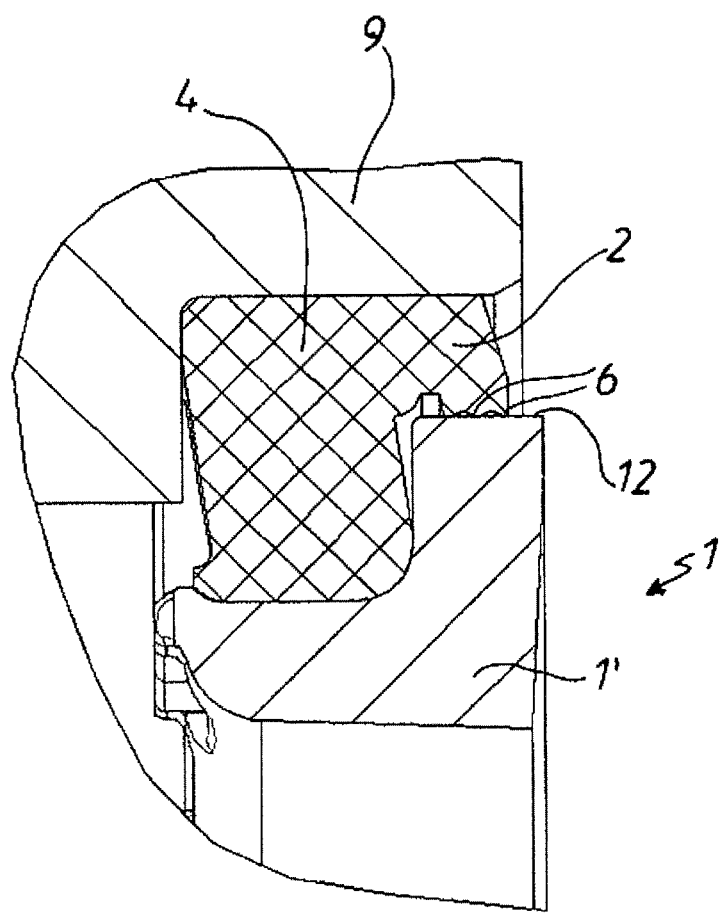
FIG. 2 shows a cutaway view of the running gear seal in position following assembly.

FIG. 2 shows the slide ring seal 1 in position after assembly. In addition to the slide ring 1' and the sealing element 2, the housing element 9 can also be seen. Moreover, the profile 6 forming the anti-contamination lips, which rests on the outer circumferential surface 12 of the slide ring 1', can also be seen. The contour of the outer circumferential surface 7 of the projection 4 shown in FIG. 1 can no longer be seen here, since the protruding elastomer material 8 has moved into the recessed areas as a result of the axial pressing in of the sealing element 2 into the receiving bore of the housing element 9.

Due to the profile 6, contamination, which would be expected to penetrate in the direction of the projection 4, will not lead to shifting or deformation of the projection 4. The proposed geometry of the sealing element 2 directs the force of infiltrating contamination directly into the respective housing 9 surrounding the slide ring seal 1 so that no further impact on the slide ring seal 1 or the slide ring 1' can arise. As a result of the strong radial distortion of the projection 4, the centering of the slide ring 1' is also improved, whereby the holding torque between the slide ring 1' within the housing element 9 and the respective housing element 9 is increased. Not only is the service life of the slide ring seal 1 substantially increased, but the services lives of the downstream components are also substantially increased.

The invention claimed is:

1. A slide ring seal, comprising a sealing element and a counter ring, the counter ring having a radial leg configured as a sliding region and having an axial leg configured to seat the sealing element, the sealing element comprising:
   a main body;
   a leg projecting in a first axial direction from a first side of the main body; and
   a plurality of projections projecting in a second axial direction opposite the first axial direction from a second side of the main body; and
   wherein said leg projects toward a first end of the main body, the leg having a first surface seating against the radial leg of the counter ring, said first surface having a corrugated profile, the leg having a second surface that is radially opposite the first surface and that adjoins said first end of the main body;
   wherein the second surface forms a static seal with a housing element external to the sealing element, said second surface having an irregular shape comprising protrusions when in an uncompressed state; and
   wherein the plurality of projections projecting from the second side of the main body project toward a second end of the main body, said plurality of projections being configured as an anti-rotation lock for the slide ring seal; and
   wherein said plurality of projections contact said axial leg and a distal end of said axial leg extends beyond a distal end of said projections; and
   wherein the axial leg has an outer circumferential surface and a inner circumferential surface connected by a curved circumferential surface, and recesses are formed in the axial leg and extend radially inward from the outer circumferential surface so that the curved circumferential surface adjacent the inner circumferential surface is continuous.

2. The slide ring seal according to claim 1, wherein the first profile is formed as a labyrinth.

3. The slide ring seal according to claim 1, wherein the first profile is formed as a corrugated profile.

4. The slide ring seal according to claim 1, wherein the anti-contamination lips of the first profile are formed having a triangular or quadrangular cross section.

5. The slide ring seal according to claim 1 installed as a running gear seal.

* * * * *